US008182152B2

(12) United States Patent
Plunkett et al.

(10) Patent No.: US 8,182,152 B2
(45) Date of Patent: May 22, 2012

(54) FLEXIBLE LINER FOR FIBC OR BAG-IN-BOX CONTAINER SYSTEMS WITH IMPROVED TENSILE STRENGTH

(75) Inventors: James Plunkett, Wareham, MA (US); Joseph Sullivan, Plymouth, MA (US)

(73) Assignee: CDF Corporation, Plymouth, MA (US)

( * ) Notice: Subject to any disclaimer, the term of this patent is extended or adjusted under 35 U.S.C. 154(b) by 1227 days.

(21) Appl. No.: 11/392,228

(22) Filed: Mar. 28, 2006

(65) Prior Publication Data
US 2007/0237433 A1 Oct. 11, 2007

(51) Int. Cl.
*B65D 33/00* (2006.01)
*B65D 30/08* (2006.01)
*B65D 30/20* (2006.01)

(52) U.S. Cl. ......... 383/105; 383/109; 383/116; 383/120

(58) Field of Classification Search .................. 383/105, 383/109, 116, 120
See application file for complete search history.

(56) References Cited

U.S. PATENT DOCUMENTS

| 875,780 | A | 1/1908 | Coats |
|---|---|---|---|
| 931,808 | A | 8/1909 | Smith |
| 1,120,058 | A | 12/1914 | Hutto |
| 1,132,000 | A | 3/1915 | Dight |
| 1,135,866 | A | 4/1915 | Turner |
| 2,083,776 | A | 6/1937 | Ferguson |
| 2,155,057 | A | 4/1939 | Moore |
| 2,260,064 | A | 10/1941 | Stokes |
| 2,333,587 | A | 11/1943 | Salfisberg |
| 2,339,156 | A | 1/1944 | Davis |
| 2,339,665 | A | 1/1944 | Alman |
| 2,352,503 | A | 6/1944 | Walton |
| 2,446,308 | A | 8/1948 | Smith |
| 2,533,554 | A | 12/1950 | Byerly |
| 2,638,263 | A | 5/1953 | Jesnig |
| 2,720,998 | A | 10/1955 | Potter |
| 2,738,796 | A | 3/1956 | Chadwick |
| 2,757,669 | A | 8/1956 | Gewecke et al. |
| 2,799,314 | A | 7/1957 | Dreyer et al. |
| 794,125 | A | 4/1958 | Locke |
| 2,930,423 | A | 3/1960 | Cunningham |
| 2,950,037 | A | 8/1960 | Orsini |
| 2,951,628 | A | 9/1960 | Grussen |

(Continued)

FOREIGN PATENT DOCUMENTS

CA 1 159 379 12/1983
(Continued)

OTHER PUBLICATIONS

Author unknown, "TNT: TNT Liquid Discharge Roller Arm," 2 pgs., date unknown.

(Continued)

*Primary Examiner* — Jes F Pascua
(74) *Attorney, Agent, or Firm* — Dorsey & Whitney LLP (57) ABSTRACT

A liner for use in a bulk container is provided. The liner comprises a first flexible panel a second flexible panel and a first seal joining the first and second panels and a second seal joining the first and second panels. The first flexible panel comprises at least one ply of thermoplastic material and the second flexible panel comprises at least one ply of material that has a higher heat threshold than the at least one ply contained in the first flexible panel.

9 Claims, 5 Drawing Sheets

U.S. PATENT DOCUMENTS

| | | |
|---|---|---|
| 2,956,839 A | 10/1960 | Hermanns |
| 2,973,119 A | 2/1961 | Parker |
| 3,006,257 A | 10/1961 | Orsini |
| 3,039,656 A | 6/1962 | Wentz |
| 3,044,515 A | 7/1962 | Eades |
| 3,087,491 A | 4/1963 | Gewecke et al. |
| 3,119,548 A | 1/1964 | Cook et al. |
| 3,143,277 A | 8/1964 | LaFleur |
| 3,208,658 A | 9/1965 | Membrino |
| 3,224,640 A | 12/1965 | Schneider |
| 3,244,576 A | 4/1966 | Swartz |
| 3,253,764 A | 5/1966 | Goetschius |
| 3,275,197 A | 9/1966 | Eklund |
| 3,289,386 A | 12/1966 | Farmer |
| 3,319,684 A | 5/1967 | Calhoun |
| 3,349,991 A | 10/1967 | Kessler |
| 3,367,380 A | 2/1968 | Dickey |
| 3,370,774 A | 2/1968 | Hopf |
| 3,384,106 A | 5/1968 | Isbrandtsen |
| 3,386,645 A | 6/1968 | Powell |
| 3,415,440 A | 12/1968 | Watters |
| 3,434,652 A | 3/1969 | Shore |
| 3,447,732 A | 6/1969 | Jonas |
| 3,462,067 A | 8/1969 | Shore |
| 3,510,142 A | 5/1970 | Erke |
| 3,550,662 A | 12/1970 | Remke et al. |
| 3,559,847 A | 2/1971 | Goodrich |
| 3,709,426 A | 1/1973 | Farkas |
| 3,739,977 A | 6/1973 | Shapiro et al. |
| 3,761,013 A | 9/1973 | Schuster |
| 3,836,217 A | 9/1974 | Shiina |
| 3,853,238 A | 12/1974 | Luisada et al. |
| 3,868,891 A | 3/1975 | Parish |
| 3,951,284 A | 4/1976 | Fell et al. |
| 3,965,953 A | 6/1976 | Becker et al. |
| 3,989,157 A | 11/1976 | Veenema |
| 3,995,806 A | 12/1976 | McSherry |
| 4,011,798 A | 3/1977 | Bambara et al. |
| 4,025,048 A | 5/1977 | Tibbitts |
| 4,085,244 A | 4/1978 | Stillman |
| 4,169,548 A | 10/1979 | Bond |
| 4,174,051 A | 11/1979 | Edwards |
| 4,177,907 A | 12/1979 | Funaioli et al. |
| 4,184,527 A | 1/1980 | Kawamura |
| 4,239,111 A | 12/1980 | Conant et al. |
| 4,267,960 A | 5/1981 | Lind et al. |
| 4,270,533 A | 6/1981 | Andreas |
| 4,309,466 A | 1/1982 | Stillman |
| 4,362,199 A | 12/1982 | Futerman |
| 4,421,253 A | 12/1983 | Croley |
| 4,449,646 A | 5/1984 | Bonerb et al. |
| 4,457,456 A | 7/1984 | Derby et al. |
| 4,461,402 A | 7/1984 | Fell et al. |
| 4,476,998 A | 10/1984 | Bonerb et al. |
| 4,482,074 A | 11/1984 | Lalley |
| 4,524,459 A | 6/1985 | Titchenal |
| 4,548,321 A | 10/1985 | Mockesch et al. |
| 4,560,090 A | 12/1985 | Okushita |
| 4,561,107 A | 12/1985 | Herder |
| 4,596,040 A | 6/1986 | LaFleur et al. |
| 4,597,102 A | 6/1986 | Nattrass |
| RE32,232 E | 8/1986 | Bonerb et al. |
| 4,636,190 A | 1/1987 | Herder |
| 4,673,112 A | 6/1987 | Bonerb |
| 4,674,127 A | 6/1987 | Yamada et al. |
| 4,676,373 A | 6/1987 | Schneider |
| 4,715,508 A | 12/1987 | Schurch |
| 4,718,577 A | 1/1988 | Morris et al. |
| 4,730,942 A | 3/1988 | Fulcher |
| 4,781,472 A | 11/1988 | LaFleur et al. |
| 4,783,178 A | 11/1988 | Herder |
| 4,790,029 A | 12/1988 | LaFleur et al. |
| 4,796,788 A | 1/1989 | Bond |
| 4,804,113 A | 2/1989 | Ciaccio |
| 4,850,506 A | 7/1989 | Heaps et al. |
| 4,874,258 A | 10/1989 | Marino |
| 4,898,301 A | 2/1990 | Schick |
| 4,917,255 A | 4/1990 | Foy |
| 4,931,034 A | 6/1990 | Wagner |
| 4,941,754 A | 7/1990 | Murdock |
| 4,997,108 A | 3/1991 | Hata |
| 4,998,990 A | 3/1991 | Richter et al. |
| 5,002,194 A | 3/1991 | Nichols |
| 5,020,922 A | 6/1991 | Schirmer |
| 5,029,734 A | 7/1991 | Nichols |
| 5,037,002 A | 8/1991 | Tschanen |
| 5,040,693 A * | 8/1991 | Podd et al. ............... 220/1.5 |
| 5,054,644 A | 10/1991 | Greenslade |
| 5,056,667 A | 10/1991 | Coogan |
| 5,074,460 A | 12/1991 | Hanekamp |
| 5,096,092 A | 3/1992 | Devine |
| 5,104,236 A | 4/1992 | LaFleur |
| 5,120,586 A * | 6/1992 | Nedzu et al. ............. 428/35.2 |
| 5,127,893 A | 7/1992 | Lafleur |
| 5,156,291 A | 10/1992 | Mielke |
| 5,193,710 A * | 3/1993 | Podd et al. ............... 220/1.6 |
| 5,195,661 A | 3/1993 | Light |
| 5,253,763 A | 10/1993 | Kirkley et al. |
| 5,269,414 A | 12/1993 | D'Hollander |
| 2,239,156 A | 1/1994 | Davis |
| 5,302,402 A | 4/1994 | Dudenhoeffer et al. |
| 5,314,086 A | 5/1994 | Short |
| 5,314,250 A | 5/1994 | Lee |
| 5,330,069 A | 7/1994 | Jamison et al. |
| 5,335,820 A | 8/1994 | Christianson |
| 5,338,117 A | 8/1994 | Kucksdorf et al. |
| 5,344,048 A | 9/1994 | Bonerb |
| 5,344,065 A | 9/1994 | Moran |
| 5,350,239 A | 9/1994 | Strand et al. |
| 5,368,395 A * | 11/1994 | Crimmins ............... 383/107 |
| 5,400,916 A | 3/1995 | Weber |
| 5,427,306 A | 6/1995 | Petriekis et al. |
| 5,487,470 A | 1/1996 | Pharo |
| 5,489,037 A | 2/1996 | Stopper |
| 5,492,270 A | 2/1996 | Avery et al. |
| 5,494,394 A | 2/1996 | Podd et al. |
| 5,499,743 A | 3/1996 | Blumenkron |
| 5,531,361 A | 7/1996 | Podd |
| 5,547,284 A * | 8/1996 | Imer ....................... 383/104 |
| 5,549,944 A | 8/1996 | Abate |
| 5,588,549 A | 12/1996 | Furtner |
| 5,618,254 A | 4/1997 | Derby |
| 5,636,764 A | 6/1997 | Bonerb |
| 5,660,299 A | 8/1997 | Harvey |
| 5,692,546 A * | 12/1997 | Podd et al. ............... 141/68 |
| 5,711,444 A | 1/1998 | Meacham et al. |
| 5,765,723 A | 6/1998 | Wilcox |
| 5,775,541 A | 7/1998 | Perkins |
| 5,788,121 A | 8/1998 | Sasaki et al. |
| 5,799,818 A | 9/1998 | Ringer |
| 5,851,072 A | 12/1998 | LaFleur |
| 5,865,541 A | 2/1999 | Lafleur |
| 5,915,596 A | 6/1999 | Credle, Jr. |
| 5,918,984 A | 7/1999 | LaFleur et al. |
| 5,941,421 A | 8/1999 | Overman et al. |
| 5,984,850 A * | 11/1999 | Derby ........................ 493/29 |
| 5,988,422 A | 11/1999 | Vallot |
| 6,120,181 A | 9/2000 | Wilcox |
| 6,139,482 A * | 10/2000 | Lafleur ..................... 493/217 |
| 6,193,416 B1 | 2/2001 | Kawamata et al. |
| 6,234,351 B1 | 5/2001 | Wilcox |
| 6,332,711 B1 * | 12/2001 | Inuzuka et al. .............. 383/9 |
| 6,371,646 B1 | 4/2002 | LaFleur |
| 6,374,579 B1 | 4/2002 | Muller |
| 6,378,733 B1 | 4/2002 | Boonzaier |
| 6,427,873 B2 | 8/2002 | Wilcox |
| 6,443,617 B2 | 9/2002 | Tetenborg |
| 6,467,652 B2 | 10/2002 | Wilcox et al. |
| 6,527,445 B2 * | 3/2003 | LaFleur et al. ............. 383/37 |
| 6,533,122 B1 | 3/2003 | Plunkett |
| 6,536,687 B1 | 3/2003 | Navis et al. |
| 6,588,681 B2 | 7/2003 | Rothrum et al. |
| 6,595,441 B2 | 7/2003 | Petrie et al. |
| 6,607,097 B2 | 8/2003 | Savage et al. |
| 6,644,510 B2 | 11/2003 | Kawolics et al. |
| 6,663,018 B2 | 12/2003 | Rothrum et al. |
| 6,752,179 B1 | 6/2004 | Schwartz |

| | | | |
|---|---|---|---|
| 6,883,683 B1 | 4/2005 | Cunningham et al. | |
| 7,077,309 B2 | 7/2006 | Andrews | |
| 7,244,064 B2* | 7/2007 | Sullivan, Jr. | 383/22 |
| 7,334,702 B2 | 2/2008 | Cunningham et al. | |
| 8,075,188 B2* | 12/2011 | Plunkett et al. | 383/119 |
| 2002/0071922 A1 | 6/2002 | Bailey | |
| 2002/0148857 A1 | 10/2002 | Savage et al. | |
| 2002/0164089 A1 | 11/2002 | LaFleur et al. | |
| 2003/0235349 A1 | 12/2003 | Ricahrdson, Jr. et al. | |
| 2004/0118741 A1 | 6/2004 | Sullivan, Jr. | |
| 2005/0017011 A1 | 1/2005 | Andrews | |
| 2005/0078890 A1* | 4/2005 | Abe et al. | 383/201 |
| 2005/0100252 A1* | 5/2005 | Rivlin et al. | 383/116 |
| 2005/0220369 A1* | 10/2005 | Sullivan, Jr. | 383/22 |
| 2005/0220639 A1 | 10/2005 | Sasaki et al. | |
| 2006/0023973 A1 | 2/2006 | Plunkett | |
| 2007/0076988 A1 | 4/2007 | Sullivan et al. | |
| 2007/0201774 A1* | 8/2007 | Plunkett et al. | 383/109 |

FOREIGN PATENT DOCUMENTS

| | | |
|---|---|---|
| CA | 2 156 796 | 2/1997 |
| DE | 1 486 433 | 4/1969 |
| DE | 6 059 8 | 11/1989 |
| DE | G 89 06 059.8 | 11/1989 |
| EP | 0 098 322 A1 | 1/1984 |
| EP | 0 362 102 | 4/1990 |
| EP | 0 276 994 | 12/1992 |
| EP | 1 277 666 A1 | 1/2003 |
| EP | 1435265 | 7/2004 |
| EP | 1415719 | 5/2009 |
| FR | 1.331.060 | 5/1963 |
| FR | 2 316 151 | 3/1977 |
| FR | 2 375 113 | 8/1978 |
| FR | 2 742 129 A1 | 6/1997 |
| GB | 1 591 323 A | 6/1981 |
| GB | 2 194 512 | 3/1988 |
| GB | 2 245 883 | 1/1992 |
| GB | 2 268 231 | 1/1994 |
| GB | 2 323 846 A | 10/1998 |
| GB | 2 356 854 | 6/2001 |
| JP | 64-009174 | 1/1989 |
| JP | 2-139383 | 5/1990 |
| JP | 5-221451 | 8/1993 |
| JP | 6-115557 | 4/1994 |
| JP | 6-122457 | 5/1994 |
| JP | 6-179455 | 6/1994 |
| JP | 6-255657 | 9/1994 |
| JP | 8-104391 | 4/1996 |
| WO | WO 82/03838 | 11/1982 |
| WO | WO 89/11422 | 11/1989 |
| WO | WO 98/32539 | 7/1998 |
| WO | 02/057151 | 7/2002 |
| WO | 02/064456 | 8/2002 |
| WO | WO 02/64456 A1 | 8/2002 |
| WO | WO 02/74226 A2 | 9/2002 |
| WO | 2007/038438 | 4/2007 |
| WO | WO 2007/038438 A1 | 4/2007 |

OTHER PUBLICATIONS

Advertisement, "Designed with Food in Mind," "The Unifold Food Grade Intermediate Bulk Container," LB Systemer a/s Uni-Fold, Nordgarde 1A-4520 Svinninge Denmark, 5 pgs., date unknown.

Advertisement, "Stocklin, Collapsible Container," "Innovative and Environment-Friendly Packaging," Walter Stocklin AG, Forder Und Lagertechnik, CH-4143 Dornach/Schweiz, 4 pgs., date unknown.

Advertisement, "CFS Developments (Proprietary) Ltd.," Postal Address: P.O. Box 4852 Luipaardsvlei 1743 South Africa, 4 pgs., date unknown.

Advertisement, Reusable Container Systems, "Industry Leader in quality, innovation and service," Ropak Corporation, Materials Handling Group, A Member of the Linpac Group of Companies, 7 pgs., date unknown.

Advertisement, "ECONOBOX, A Whole New Dimension," "Cost-effective Solutions for Materials Handling," GE Polymer Logistics, 3 pgs., date unknown.

Advertisement, "Introducing the Arena 330 Shipper," "It beats the drum and everything else," GE Silicones, A. R. Arena Products, Inc., 2101 Mt. Read Blvd., Rochester, New York 1465, 4 pgs., date unknown.

Advertisement, "TNT Container Logistics," :"Containers for Hazardous Goods," "Hazcon & Uni-Fold," 2 pgs., date unknown.

Advertisement, "TNT Container Logistics, Containers for Hazardous Goods," Hazcon & Uni-Fold, 2 pgs., date unknown.

* cited by examiner

FLEXIBLE LINER FOR FIBC OR BAG-IN-BOX CONTAINER SYSTEMS WITH IMPROVED TENSILE STRENGTH

FIELD OF THE INVENTION

The present invention relates to flexible liners for use in bulk containers such as those used in flexible intermediate bulk container ("FIBC") systems or bag-in-box container systems. More particularly, the present invention relates to systems and methods for decreasing the cycle times and costs, and improving quality, of manufacturing liners in a FIBC or bag-in-box container system.

BACKGROUND OF THE INVENTION

In recent years a number of industries have adopted the FIBC or bag-in-box concept for storing and transporting liquid and particulate commodities in relatively large quantities. For example, the FIBC or bag-in-box concept has been employed for transporting in bulk such diverse products as vegetable oils, salad dressings, syrups, soy sauce, peanut butter, pharmaceuticals, talc, motor oil, industrial chemicals, detergents in liquid or powder form, and toiletry products or ingredients.

The FIBC concept is a bulk container system comprising a flexible liner in a flexible or semi-flexible bag. In one embodiment, a FIBC bag is made of a woven material (e.g., woven polymer, TYVEX®, canvas, wire mesh or net). The flexible liner is typically chemically resistant and impermeable to water and air and serves as the container for a selected commodity. The FIBC bag serves as a protective container for the liner and its contents. A FIBC bag is described in U.S. Pat. No. 4,596,040 to LaFleur et al., which issued Jun. 17, 1986, and is hereby incorporated by reference in its entirety.

The bag-in-box concept comprises a flexible liner and a rigid or semi-rigid box. The flexible liner is typically chemically resistant and impermeable to water and air and serves as the container for a selected commodity. The box may be made of plywood or other wood materials, cardboard, fiberboard, metal or plastic. The box serves as a protective container for the liner and its contents. A box for a bag-in-box system is disclosed in U.S. Pat. No. 6,533,122 to Plunkett, which issued Mar. 18, 2003, and is hereby incorporated by reference in its entirety. A bag for use in a bag-in-box system is described in U.S. patent application Ser, No. 10/818,882, which was filed Apr. 6, 2004, is entitled "Bag With Flap For Bag-In-Box Container System" and is hereby incorporated by reference in its entirety.

By way of example, a liner used for shipping commodities in bulk, via a FIBC or bag-in-box system, typically may have a volume in the order of 60 cubic feet. In one embodiment, the liner will include at least a drain fitting near the bottom of the liner whereby the liner's contents may be removed. In other embodiments, the liner will include at least a filler fitting near the top of the liner whereby the liner may be filled with its contents. In other embodiments, the liner will include both a filler fitting near the top of the liner and a drain fitting near the bottom of the liner. In one embodiment, the drain fitting is on the gusseted side as described in U.S. Patent Application Ser. No. 60/720,855, which was filed Sep. 26, 2005, entitled "Flexible Liner With Fitting On Gusseted Side" and which is hereby incorporated by reference in its entirety.

The liner may be of any suitable configuration. For example, the liner may be generally shaped like a cube. It also can be configured so that a cross-section that is generally parallel to the top and bottom of the liner is square, rectangular, circular, or any other suitable geometry.

In embodiments of the liner with at least a drain fitting, the outer container (i.e., the bag of a FIBC system or the box of a bag-in-box system) is provided with a discharge opening near or at the bottom end of the outer container through which the liquid or particulate contents can be discharged from the liner via its drain fitting. The discharge opening of the outer container may be fitted with a drain fitting that mates with or accommodates the drain fitting of the liner. This mating arrangement between drain fittings of the liner and outer container ensures that material discharged from the liner will be directed to the intended receiving facility and prevents the material from accumulating in the bottom of the outer container.

In embodiments of the liner with at least a filler fitting, the outer container usually comprises a cover or top panel that is removable to permit access to the liner and the filler fitting.

One consideration of the FIBC or bag-in-box mode of shipment of materials in bulk is that the outer container can be a non-returnable or one-way container. For example, where the outer container is a box for a bag-in-box system and is generally made of a corrugated fiberboard or the like, the box can be discarded after use. Alternatively, the box may consist of interlocking panels of metal, wood, or a stiff or rigid plastic material, in which case the box may be disassembled and returned to the shipper after the associated liner has been emptied of its contents.

Where the outer container is a bag for a FIBC system and is made of a low cost woven material, the bag can be discarded after use. Alternatively, where the material of the bag is more expensive, the bag may be collapsed and returned to the shipper after the associated liner has been emptied of its contents.

With respect to the FIBC and bag-in-box concepts as applied to bulk shipment of commodities, the plastic flexible liners have taken various forms. One common form is the so-called "pillow" type, which consists of at least two sheets of film sealed together at their edges. An example of this is described with respect to U.S. patent application Ser. No. 11/361,691, which was filed Feb. 24, 2006, entitled "Flexible Liner For FIBC Or Bag-In-Box Container Systems With Improved Flex Crack Resistance" and is hereby incorporated by reference in its entirety. Another common form is the six-sided flexible liners (e.g., liners that take the shape of a cube or rectangular parallelepiped when filled) made from a plurality of sheets of film.

Regardless of the form the liner takes, the liner can be formed via a registration and tracking process. The registration and tracking can be performed using an optical scanner or any type of device that is capable of reading or detecting a marking placed on an item (or a section of an item), or of noticing differences in shape, size, texture, height or other physical variation in an item (or the absence of an item). The device uses the information obtained from the item to determine the position of the item. When multiple sections of an item are being combined from multiple locations, the information obtained by the device may be used to aid in combining the sections at the correct places.

The items are transported on transportation devices/conveyors to a desired location to be combined. The registration and tracking system uses the position information of the sections of the item and accordingly increases, decreases, or maintains the speed of the transportation devices so that when the multiple sections of an item are combined they are combined at the correct place.

Another method of forming the liner is through the use of a nip drive. The nip drive rotates a desired amount of revolutions in order to produce a desired amount of material to be processed. The nip drive eliminates the need for optics and can be useful if the item does not contain a registration mark. Furthermore, liners can be formed by hand without the use of large or complex machinery.

Traditionally, all the sections of a flexible liner are composed of polyethylene layers. Polyethylene tends to stretch and is limited in the amount of heat that can be applied to it. When sections of polyethylene stretch, the registration and tracking process, or nip drive operator, may not detect the stretching, causing misalignment of the item when the sections are combined. Also, when the sections are sealed together, the polyethylene is weakened by the heat used to form the seal and is susceptible to tearing. When multiple plies or layers of polyethylene are used to form the sections, the heat needed to seal the sections together is generally higher than the heat needed to seal sections comprised of a single ply or layer of polyethylene. As the heat used to seal the polyethylene layers together increases, the susceptibility of the polyethylene layers to tearing also increases. Therefore, polyethylene layers are generally weakened more in multiple layer applications than single layer applications. This is particularly the case where there are multiple layers joined together, such as at the apex of the liner. All of these difficulties increase the cycle time of the manufacturing process and decrease the quality of the liner. Some flexible liners use high heat threshold materials, e.g., nylon, on all sides of the liner. The nylon is used to strengthen the seals of the liner and prevent tearing and stretching of the liner. Nylon, however, is expensive.

There is a need in the art for a system and method of reducing the cycle times and costs, and improving quality, of manufacturing liners in a FIBC or bag-in-box container system.

BRIEF SUMMARY OF THE INVENTION

In one embodiment, a liner for use in a bulk container is provided. The liner comprises a first flexible panel, a second flexible panel, a first seal joining the first and second panels, and a second seal joining the first and second panels. The first flexible panel comprises at least one ply of thermoplastic material and the second flexible panel comprises at least one ply of material that has a higher heat threshold than the at least one ply contained in the first flexible panel.

In one embodiment, a liner for use in a bulk container is provided. The liner comprises a first flexible panel, a second flexible panel, a first seal joining the first and second panels, and a second seal joining the first and second panels. The first flexible panel comprises at least one ply of thermoplastic material and the second flexible panel comprises at least one ply of material that has a higher tensile strength than the at least one ply contained in the first flexible panel.

In one embodiment, a liner for use in a bulk container is provided. The liner comprises a first flexible panel, a second flexible panel, a third flexible panel, and a fourth flexible panel. The liner also comprises a first seal joining the first and third panels, a second seal joining the second and third panels, a third seal joining the first and third panels, a fourth seal joining the second and third panels, a fifth seal joining the first and fourth panels, a sixth seal joining the second and fourth panels, a seventh seal joining the first and fourth panels, an eighth seal joining the second and fourth panels, a ninth seal joining the first and second panels, and a tenth seal joining the first and second panels. The first flexible panel, second flexible panel, third flexible panel, and fourth flexible panel comprise at least one ply. At least one of the first flexible panel, second flexible panel, third flexible panel, and fourth flexible panel comprises at least one ply of material that has a higher heat threshold than the at least one ply of the first flexible panel, second flexible panel, third flexible panel, and fourth flexible panel.

In one embodiment, a liner for use in a bulk container is provided. The liner comprises a front portion, a rear portion, and first and second side portions, wherein the front, rear, and first and second side portions are sealed together to form six panels including two gusseted panels. One of the front portion, rear portion, first portion and second side portion comprises at least one ply of material that has a higher heat threshold than at least one ply of the front portion, rear portion, and first and second side portions.

In one embodiment, a method for forming a liner for use in a bulk container is provided. The method comprises providing a front portion, a rear portion, and first and second side portions. At least one of the front portion, rear portion, first portion and second side portions comprise a high heat threshold material and at least one of the front portion, rear portion, first and second side portions comprise only non-high heat threshold materials. The method also comprises folding the first and second side portions to form gussets and sealing the front portion and the rear portion to respective edges of the side portions. The method also comprises sealing a top end of the front portion and a top end of the rear portion to top folds of the first and second side portions and sealing a bottom end of the front portion and a bottom end of the rear portion to bottom folds of the first and second side portions.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION

The present invention is directed to a flexible liner 1 for use in bulk containers such as those used in FIBC systems or bag-in-box container systems. While certain liner embodiments are discussed herein, the particular liner configuration is generally not important to the present invention, and, instead, any suitable liner configuration may be used. For illustrative purposes only, the liner can comprise a front portion, a rear portion, and first and second side portions. The front portion, rear portion, and side portions are sealed together to form a front panel, a rear panel, two gusseted side panels, a top panel, and a bottom panel. More specifically, longitudinal edges of the front portion and the rear portion are sealed to respective edges of the side portions. The first and second side portions are folded to form gussets. Top ends of the front portion and the rear portion are sealed to top folds of the first and second side portions, and bottom ends of the front portion and the rear portion are sealed to bottom folds of the first and second side portions.

Figure 1:
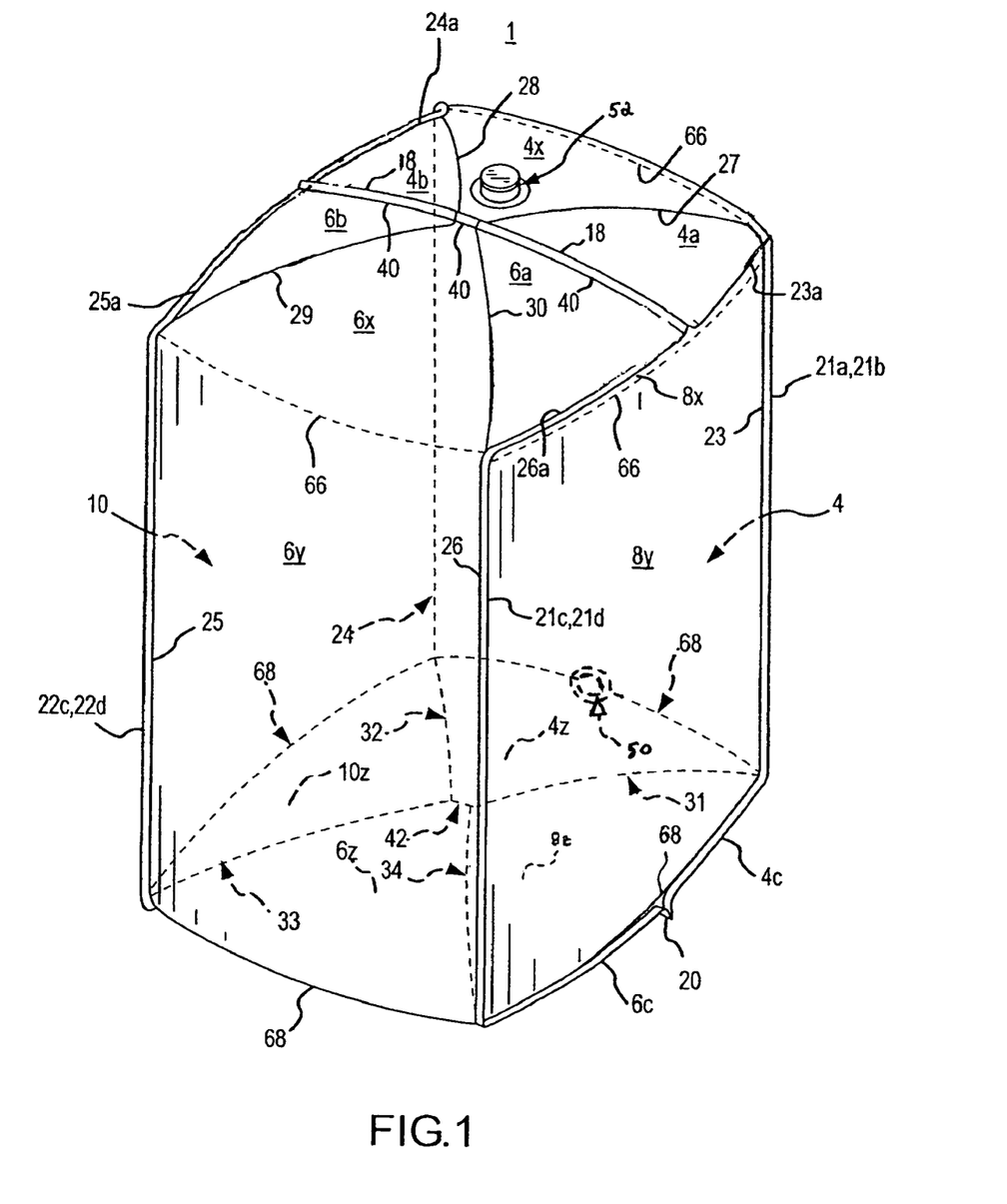
FIG. 1 is a top isometric view of a liner in its inflated or filled state.

In one embodiment, at least one of the front portion, rear portion, and two side portions has at least one high heat threshold material layer or high tensile strength material layer, whereas the remaining portions do not. For simplicity, when the term high heat threshold material is used, generally a material that has a high tensile strength can be substituted for the high heat threshold material. In one embodiment, the front portion is comprised of at least one high heat threshold material, whereas the rear portion and the two side portions do not comprise a high heat threshold layer. In another embodiment, the two side portions comprise a high heat threshold layer whereas the front portion and rear portion do not. In one embodiment, the two side portions and front portion comprise a high heat threshold layer whereas the rear portion does not. Types of high heat threshold layers include but are not limited to nylon coextruded or laminated to polyethylene, and polyester coextruded or laminated to polyethylene. A nylon layer has a greater tensile strength and heat threshold than a traditional polyethylene layer and therefore is less susceptible to stretching. This reduces the chance of misalignment during the combination of the portions as a result of inaccurate position readings in the registration and tracking process. The higher heat threshold also reduces the likelihood that the liner layers will be weakened from the heat used to seal the portions of the liner, thus reducing the likelihood of tearing of the liner near the seals. For convenience and simplicity of illustration, a cube liner with each portion having two plies is shown in FIGS. 1 through 5. The liner, however, can be of any shape and size, and the various portions can comprise one or many layers of material. FIG. 1 is a top isometric view of the liner 1 in its inflated or filled state. As indicated in FIG. 1, in one embodiment, the liner 1 is a four side-seal type liner 1 (i.e., a liner having four longitudinal side-seals 23, 24, 25, 26) composed of four discrete portions (i.e., a front portion 4, a rear portion 6 and two side portions 8, 10) of flexible, heat-sealable packaging material in sheet form. By way of example but not limitation, the packaging sheet material may be comprised of polyethylene, polypropylene or some other thermoplastic material or a laminate of two or more packaging materials bonded to one another. In one embodiment, the packaging sheet material comprises a high heat threshold material, which may be coextruded or laminated to at least one other packaging material. Furthermore, an additional strip or strips, double wound packaging material, additional packaging material on one or more portions, and/or the use of metallized polyethylene on one or more portions of the liner 1 can be utilized as described with respect to U.S. patent application Ser. No. 11/361,691 which was filed Feb. 24, 2006, entitled "Flexible Liner For FIBC Or Bag-In-Box Container Systems With Improved Flex Crack Resistance," incorporated above.

Each of the portions 4-10 may comprise a single sheet of packaging material ("single ply") or two or more sheets of packaging material ("multi-ply"). In the case of multi-ply portions, the individual sheets ("plies") may be of like or different material and are secured to one another only in selected areas (e.g., at seals 23, 24, 25, 26 and other such seals as discussed in this detailed description). In one embodiment, at least one of the front portion 4, rear portion 6, and two side portions 8, 10 have at least one high heat threshold material layer, whereas the remaining portions do not. In one embodiment, the front portion 4 is comprised of at least one high heat threshold material, whereas the rear portion 6 and the two side portions 8, 10 do not comprise a high heat threshold layer. In another embodiment, the two side portions 8, 10 comprise a high heat threshold layer, whereas the front portion 4 and rear portion 6 do not. In one embodiment, the two side portions 8, 10 and front portion 4 comprise a high heat threshold layer, whereas the rear portion 6 does not. In one embodiment, the high heat threshold layer is comprised of nylon coextruded or laminated to another material. In one embodiment, the material is polyethylene. In one embodiment, the high heat threshold layer is comprised of polyester coextruded or laminated to another material including but not limited to polyethylene. In one embodiment, the layers that are not high heat threshold materials are comprised of polyethylene.

Figure 2:
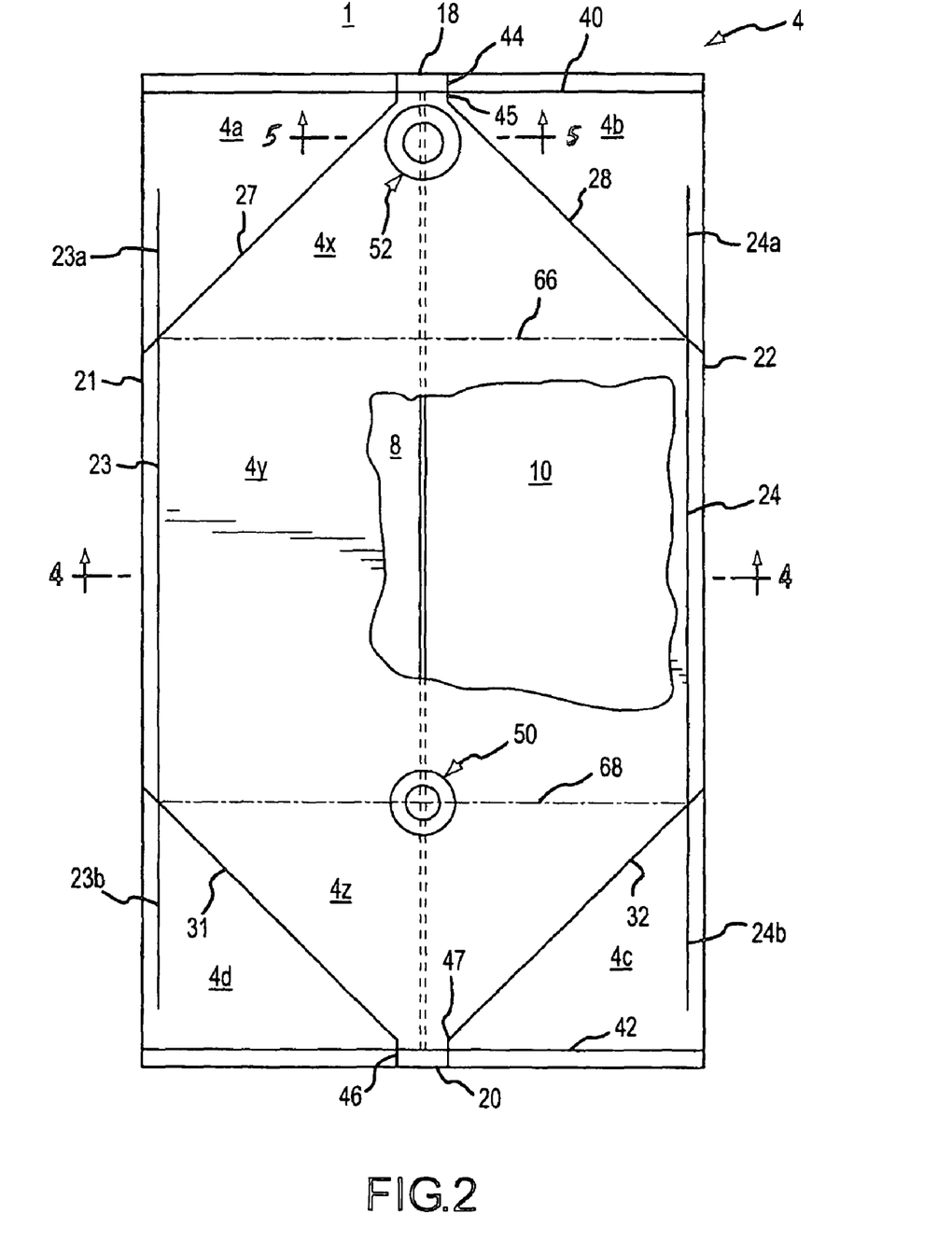
FIG. 2 is a plan view of the liner in a flattened as-made condition, with a part of the liner broken away.
Figure 3:
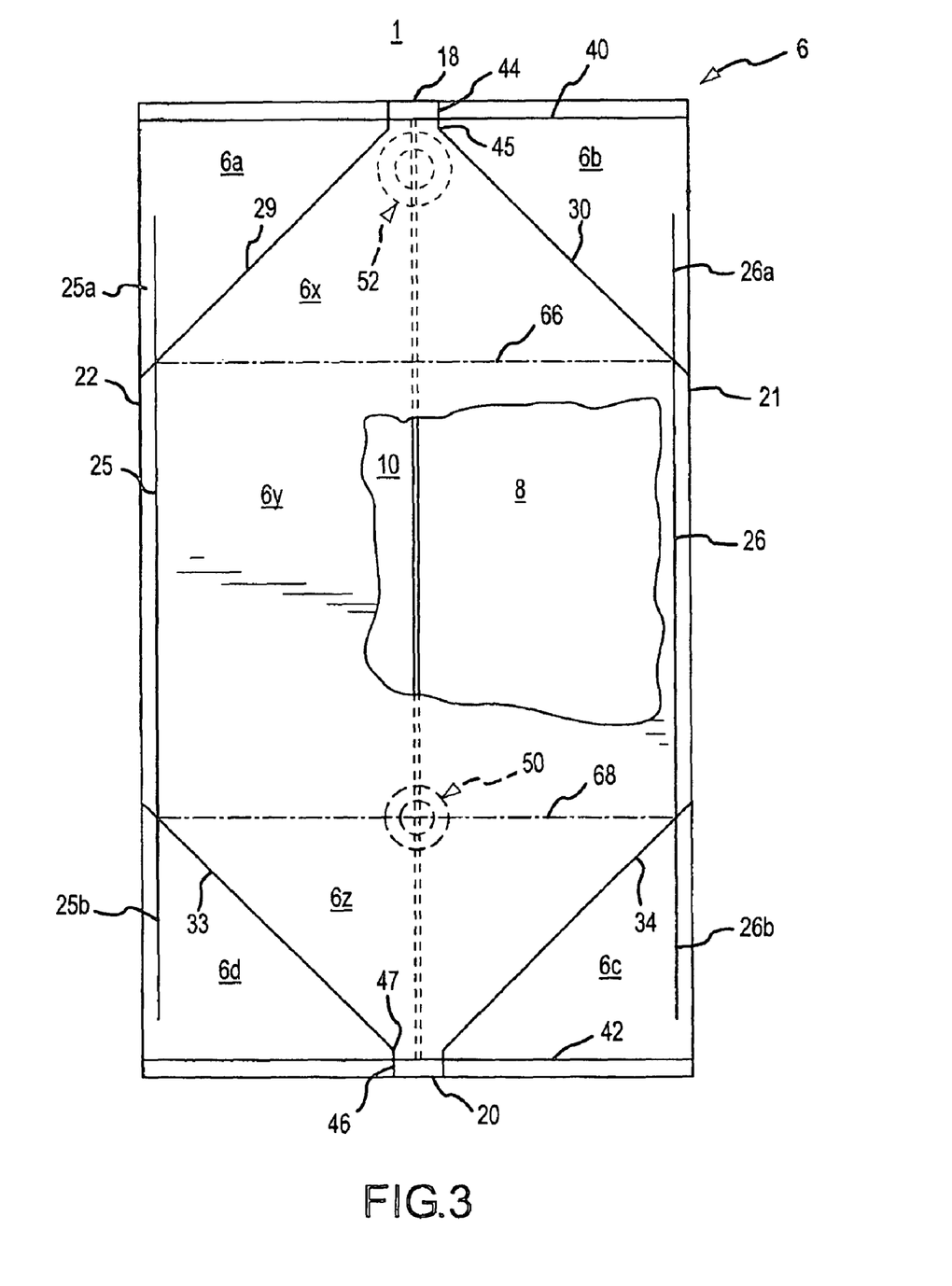
FIG. 3 is a bottom view of the same liner in its flattened as-made condition, with a part of the liner broken away.
Figure 4:
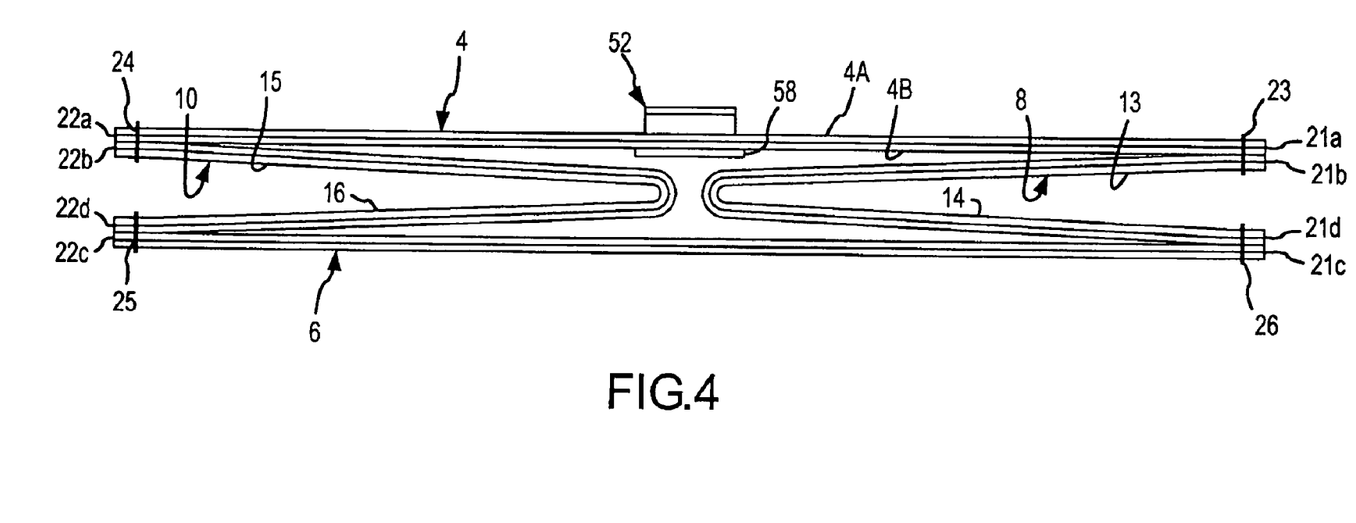
FIG. 4 is a cross sectional view taken along line 4-4 of FIG. 2.

For a discussion of the liner 1 in its flat as-formed condition, reference is now made to FIGS. 2-4. FIG. 2 is a plan view of the liner 1 in its flattened as-made condition, with part of the front portion 4 broken away to reveal the side portions 8, 10 below. FIG. 3 is a bottom view of the liner 1 in its flattened as-made condition, with part of the rear portion 6 broken away to reveal the side portions 8, 10 above. FIG. 4 is a cross sectional view of the liner 1 taken along line 4-4 of FIG. 2. As shown in FIGS. 2-4, the front portion 4 and the rear portion 6 are opposed to one another, and the side portions 8, 10 are interposed between the front portion 4 and the rear portion 6. As best illustrated in FIG. 4, the side portions 8, 10 are folded inwardly on themselves to form gussets consisting of folds 13, 14 and 15, 16, respectively.

As indicated in FIGS. 2 and 3, when the liner 1 is in the flattened as-made condition, the front portion 4 and the rear portion 6 have a generally rectangular configuration defined by a top edge 18, a bottom edge 20, and two side edges 21, 22. During manufacture, the four portions 4-10 are cut from parallel elongate supply webs of packaging material. The four portions 4-10 are substantially the same width (i.e., the distance between the side edges 21a, 22a with respect to portion 4, the distance between the side edges 21c, 22c with respect to portion 6, the distance between the side edges 21b, 21d with respect to portion 8, and the distance between the side edges 22b, 22d with respect to portion 10) as the webs from which they are separated. The side portions 8, 10 are folded and inserted between the front portion 4 and the rear portion 6 before the four portions 4-10 are cut from the supply webs.

As shown in FIGS. 2 and 4, the front portion 4 is sealed via longitudinal seal lines 23, 24 along its two longitudinally extending side edges 21a, 22a to the adjacent side edges 21b, 22b of the folds 13, 15 of the respective side portions 8, 10. As indicated in FIGS. 3 and 4, the rear portion 6 is sealed via longitudinal seal lines 25, 26 along its two longitudinally extending side edges 21c, 22c to the adjacent side edges 21d, 22d of the folds 14, 16 of the respective side portions 8, 10.

As illustrated in FIGS. 2 and 3, adjacent the top end of the liner 1, two oblique seals 27, 28 secure the front portion 4 to the folds 13, 15, and another two oblique seals 29, 30 secure the rear portion 6 to the folds 14, 16. Adjacent the bottom end of the liner 1, two oblique seals 31, 32 secure the front portion 4 to the folds 13, 15, and another two oblique seals 33, 34 secure the rear portion 6 to the folds 14, 16.

As shown in FIGS. 2 and 3, in one embodiment, the oblique seals 27, 28, 31, 32 extend through the longitudinal seals 23, 24, while the other oblique seals 29, 30, 33, 34 extend through the other longitudinal seals 25, 26. In other embodiments, the oblique seals 27-34 stop at their respective intersections with the longitudinal seals 23-26.

In one embodiment, at the top end of the liner 1, a cross seal 40 extends laterally across the front and rear portions 4, 6 adjacent and parallel to the top edge 18. The top cross seal 40 seals the front and rear portions 4, 6 together along the length of the top cross seal 40. The top oblique seals 27-30 extend from their intersections with their respective longitudinal seals 23-26 towards the top cross seal 40. In one embodiment, just prior to intersecting the top cross seal 40, each top oblique seal 27-30 curves from an oblique orientation to an orientation that is generally parallel to the longitudinal seals 23-26, thereby forming a short segment 44 with a curve 45 for each oblique seal 27-30 that extends through the top cross seal 40. In another embodiment, each top oblique seal 27-30 extends through top cross seal 40 and substantially comes to a point at the top edge 18.

As shown in FIGS. 2 and 3, at the bottom end of the liner 1, a cross seal 42 extends laterally across the front and rear portions 4, 6 adjacent and parallel to the bottom edge 20. The bottom cross seal 42 seals the front and rear portions 4, 6 together along the length of the bottom cross seal 42. The bottom oblique seals 31-34 extend from their intersections with their respective longitudinal seals 23-26 towards the bottom cross seal 42. In one embodiment, just prior to intersecting the bottom cross seal 42, each bottom oblique seal 31-34 curves from an oblique orientation to an orientation that is generally parallel to the longitudinal seals 23-26, thereby forming a short segment 46 with a curve 47 for each oblique seal 31-34 that extends through the bottom cross seal 42. In another embodiment, each bottom oblique seal 31-34 extends through bottom cross seal 42 and substantially comes to a point at the bottom edge 20.

In manufacturing the liner 1, the cross seals 40, 42 may require a greater temperature/pressure as compared to those used to make the longitudinal side seals 23-26 and the oblique seals 27-34. This is because, in one embodiment, the cross seals 40, 42 utilize twice as many layers as the side and oblique seals 23-34. For example, referring to the upper right hand corner of FIG. 2, oblique seal 28 and longitudinal side seal 24 are each formed by sealing front portion 4 and side portion 10 together. In contrast, cross seal 40 is formed by sealing together front portion 4, rear portion 6, and portion 10 folded over on itself (i.e., two layers of portion 10 are sealed together with the front and rear portions 4, 6). Since cross seals 40, 42 can require more heat, the propensity of non-high heat threshold layers to stretch or tear is increased. By adding a high heat threshold material to one of the portions that make up the cross seals 40, 42, the liner 1 is strengthened and is less prone to stretch or tear.

As illustrated in FIGS. 2 and 3, the front and rear portions 4, 6 each have a generally hexagonal configuration (as defined by their respective longitudinal side seals 23-26 and oblique seals 27-34), except for being truncated at the upper most point by the top cross seal 40 and at the bottom most point by the bottom cross seal 42. In another embodiment, each bottom oblique seal 31-34 extends through bottom cross seal 42 and substantially comes to a point at the bottom edge 20 and each top oblique seal 27-30 extends through top cross seal 40 and substantially comes to a point at the top edge 18. In yet another embodiment, there is no bottom cross seal 42 or top cross seal 40 and each bottom oblique seal 31-34 substantially comes to a point at the bottom edge 20 and each top oblique seal 27-30 substantially comes to a point at the top edge 18.

As can be understood from FIG. 1, the side portions 8, 10 also each have a generally hexagonal configuration (as defined by their respective longitudinal side seals 23-26 and oblique seals 27-34) when fully spread out flat. However, as can be understood from FIG. 1, unlike the front and rear portions 4, 6, the upper and lower most points of the side portions 8, 10 are not truncated. As can be understood from FIGS. 1-3, the hexagonal configuration of each portion 4-10 can be divided into three parts, which are a top triangular section 4x, 6x, 8x, 10x, a rectangular section 4y, 6y, 8y, 10y, and a bottom triangular section 4z, 6z, 8z, 10z. The top triangular sections 4x, 6x, 8x, 10x are defined by the top oblique seals 27-30 and top fold lines 66 that run parallel to the top cross seal 40 and intersect the intersections between the top oblique seals 27-30 and the longitudinal side seals 23-26. Similarly, the bottom triangular sections 4z, 6z, 8z, 10z are defined by the bottom oblique seals 31-34 and bottom fold lines 68 that run parallel to the bottom cross seal 42 and intersect the intersections between the bottom oblique seals 31-34 and the longitudinal side seals 23-26. The rectangular sections 4y, 6y, 8y, 10y are defined by the longitudinal side seals 23-26 and the top and bottom fold lines 66, 68.

As can be understood from FIG. 1, when the liner 1 is inflated or filled, the top triangular sections 4x, 6x, 8x, 10x fold toward each other about their respective top fold lines 66 to form the roof of the cubical liner 1, the bottom triangular sections 4z, 6z, 8z, 10z fold toward each other about their respective bottom fold lines 68 to form the floor of the cubical liner 1, and the rectangular sections 4y, 6y, 8y, 10y fold about their respective longitudinal side seals 23-26 to form the sidewalls of the cubical liner 1.

As indicated in FIG. 2, the top oblique seals 27, 28, the top cross seal 40, and the side seals 23, 24 generally define front top flaps 4a, 4b out of the front portion 4. In one embodiment, each front top flap 4a, 4b will further include corresponding areas of the side portions 8, 10 that are defined by the top oblique seals 27, 28, the top cross seal 40, and the side seals 23, 24.

As shown in FIG. 3, the top oblique seals 29, 30, the top cross seal 40, and the side seals 25, 26 generally define rear top flaps 6a, 6b out of the rear portion 6. In one embodiment, each rear top flap 6a, 6b will further include corresponding areas of the side portions 8, 10 that are defined by the top oblique seals 29, 30, the top cross seal 40, and the side seals 25, 26.

As illustrated in FIG. 1, because the front top flaps 4a, 4b are sealed to the rear top flaps 6a, 6b by the top cross seal 40, when the liner 1 is inflated or filled and takes its cubical form, the top flaps 4a, 6a extend across the top triangular section 8x and the top flaps 4b, 6b extend across the top triangular section 10x.

As indicated in FIGS. 2 and 3, in one embodiment, each longitudinal side seal 23-26 has a segment that extends across the respective top oblique seal 27-30 and into the respective top flap 4a, 4b, 6a, 6b. In one embodiment, as shown in FIGS. 2 and 3, these top segments 23a, 24a, 25a, 26a run from the intersection of the respective oblique seal 27-30 and side seal 23-26 to a point approximately halfway to the top cross seal 40. In other embodiments, the top segments 23a, 24a, 25a, 26a will have a greater or lesser length. In one embodiment, each longitudinal side seal 23-26 stops at its intersection with the respective top oblique seal 27-30 such that there are no top segments 23a, 24a, 25a, 26a.

For a continued discussion of the general configuration of one embodiment of the liner 1, reference is again made to FIGS. 1-3. As indicated in FIG. 2, the bottom oblique seals 31, 32, the bottom cross seal 42, and the side seals 23, 24 generally define front bottom flaps 4c, 4d out of the front portion 4. In one embodiment, each front bottom flap 4c, 4d will further include corresponding areas of the side portions 8, 10 that are defined by the bottom oblique seals 31, 32, the bottom cross seal 42, and the side seals 23, 24.

As shown in FIG. 3, the bottom oblique seals 33, 34, the bottom cross seal 42, and the side seals 25, 26 generally define rear bottom flaps 6c, 6d out of the rear portion 6. In one embodiment, each rear bottom flap 6c, 6d will further include corresponding areas of the side portions 8, 10 that are defined by the bottom oblique seals 33, 34, the bottom cross seal 42, and the side seals 25, 26.

As can be understood from FIG. 1, because the front bottom flaps 4c, 4d are sealed to the rear bottom flaps 6c, 6d by the bottom cross seal 42, when the liner 1 is inflated or filled and takes its cubical form, the bottom flaps 4c, 6c extend across the bottom triangular section 8z and the bottom flaps 4d, 6d extend across the bottom triangular section 10z.

As indicated in FIGS. 2 and 3, each longitudinal side seal 23-26 has a segment that extends across the respective bottom oblique seal 31-34 into the respective bottom flap 4c, 4d, 6c, 6d. In one embodiment, as shown in FIGS. 2 and 3, these bottom segments 23b, 24b, 25b, 26b run from the intersection of the respective oblique seal 31-34 and side seal 23-26 to a point nearly intersecting the bottom cross seal 42. In other embodiments, the bottom segments 23b, 24b, 25b, 26b will have a greater or lesser length. In one embodiment, each longitudinal side seal 23-26 stops at its intersection with the respective bottom oblique seal 31-34 such that there are no bottom segments 23b, 24b, 25b, 26b.

FIG. 4 illustrates one embodiment of a two-ply construction with the two plies of the front portion 4, for example, being identified as 4A and 4B. In one embodiment, ply 4A is comprised of a high heat threshold material and ply 4B is, by way of example but not limitation, comprised of polyethylene, polypropylene or some other thermoplastic material or a laminate of two or more packaging materials bonded to one another. In one embodiment, ply 4A is nylon coextruded or laminated to at least one other packaging material such as polyethylene or polypropylene. In another embodiment, ply 4A is comprised of polyethylene, polypropylene or some other thermoplastic material or a laminate of two or more packaging materials bonded to one another and ply 4B is comprised of a high heat threshold material. When a high heat threshold material is included in the front portion 4, seals 23, 24, 27, 28, 31, 32, 40, and 42 are strengthened and the liner 1 is less susceptible to tearing and stretching. This also improves the tracking and registration process. In one embodiment, side portions 8, 10 comprise high heat threshold materials and the other portions do not. When side portions 8, 10 include high heat threshold materials, substantially all of the seals in liner 1 are strengthened and the liner 1 is less susceptible to tearing and stretching. By way of illustration, below is data collected using a liner with four portions each having three plies of polyethylene (captioned polyethylene) and a liner having four portions with three plies of polyethylene forming the rear and side portions and two interior plies of polyethylene and one exterior nylon ply that is coextruded with a polyethylene layer (captioned nylon/polyethylene) forming the front portion.

| Sample Number | Tensile (kgs/in) |
|---|---|
| Polyethylene | |
| 1 | 9.54 |
| 2 | 9.5 |
| 3 | 9.67 |
| 4 | 9.59 |
| 5 | 9.6 |
| 6 | 9.56 |
| 7 | 9.38 |
| 8 | 9.7 |
| 9 | 9.41 |
| 10 | 9.66 |
| 11 | 9.67 |
| 12 | 9.85 |
| X-Bar | 9.59 |
| Nylon/Polyethylene | |
| 1 | 10.09 |
| 2 | 11.34 |
| 3 | 10.36 |
| 4 | 10.45 |
| 5 | 10.48 |
| 6 | 11.1 |
| 7 | 11.93 |
| 8 | 11.87 |
| 9 | 12.12 |
| 10 | 10.36 |
| 11 | 11.37 |
| 12 | 11.98 |
| X-Bar | 11.12 |

As illustrated in the above data, the liner containing nylon on the front portion had increased tensile strength relative to the liner that consisted of only polyethylene. The greater tensile strength of the liner containing nylon makes that liner less susceptible to stretching than the liner containing only polyethylene. This reduces the chance of misalignment during the combination of the portions as a result of inaccurate position readings in the registration and tracking process.

Also, when traditional polyethylene portions are combined, occasionally they must be cooled to prevent stretching and a weak seal from being formed. Likewise, the heat used to form the seal occasionally weakens the polyethylene layers and increases the chances of the layers tearing. By adding the nylon ply, which has a higher melting point than polyethylene, the chances for a weak seal being formed or tearing occurring are reduced.

Multiple nylon plies may be added to the liner to improve strength. Alternatively, only one nylon ply may be added to the liner. Adding one nylon ply to the liner provides the benefit of providing improved strength for purposes or registration, because having one layer of nylon in the liner during the manufacturing process assists the entire liner in avoiding stretching. The added nylon layer also helps to prevent tearing of the liner due to its high heat threshold relative to polyethylene.

For a discussion of the location of the fill and drain orifices of the liner 1, reference is now made to FIG. 2. In one embodiment, as shown in FIG. 2, the front portion 4 is formed with two openings. Mounted in those openings are two tubular fitments, a drain fitment 50 and fill fitment 52. The drain fitment 50 is intended to function as a drain and may be located generally equidistant from the two longitudinal side edges 21, 22 of the front portion 4 at a point that is almost even with the intersections between the bottom oblique seals 31, 32 and the longitudinal side seals 23, 24. The fill fitment 52 is for the purpose of filling the liner 1 and is typically located close to the intersections of the top cross seal 40 with the top oblique seals 27, 28. In one embodiment, the liner 1 will only have a drain fitment 50. In another embodiment, the liner 1 will only have a fill fitment 52. In one embodiment, the liner 1 will have both a drain fitment 50 and a fill fitment 52.

Figure 5:
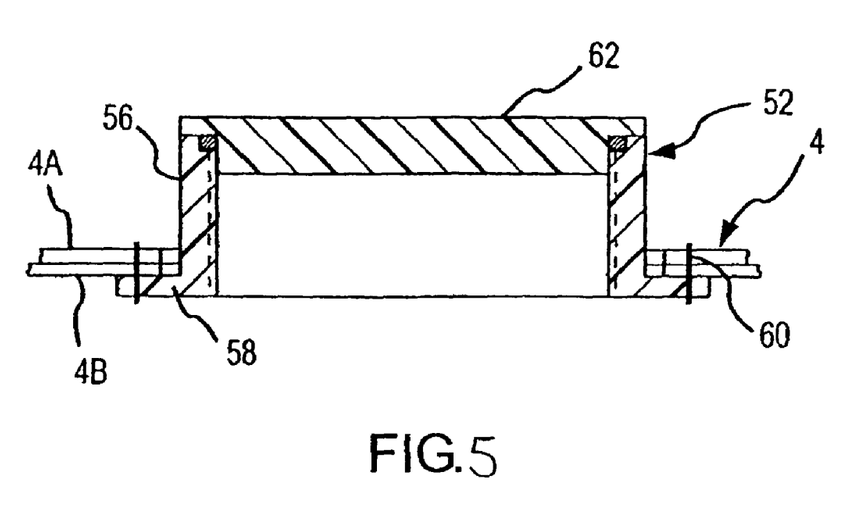
FIG. 5 is a cross sectional view of a fill fitment taken along line 5-5 of FIG. 2.

For a discussion of one method of securing the fitments 50, 52 to the front portion 4, reference is now made to FIG. 5, which is a cross sectional view of one type of fill fitment 52 taken along line 5-5 of FIG. 2. As indicated in FIG. 5, the fill fitment 52 comprises two parts, a fixed tubular part 56 and a cap 62. The fixed tubular part 56 has a flange 58 that underlies and is sealed to the front portion 4 by a circular seal 60. The heat needed to seal the front portion 4 to the flange 58 can cause the front portion 4 layers to stretch or become susceptible to tearing. The thicker the flange 58 or the more layers the front portion 4 comprises, the higher the heat needed to seal the flange 58 to the front portion 4. The more heat used, the more susceptible the layers of the front portion 4 are to stretching or tearing. Therefore, the use of a high heat threshold material layer in front portion 4 can be used to increase the strength of the seal and generally reduce the susceptibility of the front portion 4 to stretching or tearing. The cap 62 is releasably attached to and closes off the tubular part 56. The cap 62 may be attached to the tubular part 56 by a screw, bayonet, snap-fit or other suitable form of connection known in the art. The fitment or fitments can be placed on any portion and are generally placed on a portion of the liner 1 that has a high heat threshold layer so as to benefit from the increased strength provided by the high heat threshold material layer.

For a better understanding of how the four portions 4-10 join together and how the liner 1 appears when inflated or filled, reference is again made to FIG. 1. As illustrated in FIG. 1, the liner 1 assumes the general shape of a cube or a rectangular parallelepiped when is inflated or filled, with the side portions 8, 10 unfolding to eliminate the gussets. The front portion 4 forms a front wall, the rear portion 6 forms a rear wall, and the side portions 8, 10 form opposite sidewalls.

As shown in FIG. 1, because of the arrangement of the oblique seals 27-34 in relation to the longitudinal seals 23-26 and cross seals 40, 42, the four portions 4-10 come together to form the top and bottom walls of the liner 1. As illustrated in FIG. 1, the filler fitment 52 is located at the top of the liner 1 and the drain fitment 50 is located at the bottom, front side of the liner 1.

In one embodiment, the fitments 50, 52 may have different structures or shapes. In one embodiment, the filler fitment 52 may be omitted, in which case the drain fitment 50 may also serve as a filler means for the liner by attaching a pump discharge line to pump the contents into the liner 1. Conversely, the drain fitment 50 may be omitted, in which case the filler fitment 52 may also serve as a drain means for the liner by running a pump suction line down into the liner to remove the contents of the liner 1.

Although the usual construction is a liner that has a substantially cubic shape when inflated (in which case the side portions 8, 10 have substantially the same width when unfolded as the front and rear portions 4, 6), the liner also may be formed so as to have a rectangular parallelepiped shape when inflated (e.g., the side portions 8, 10 may have smaller widths than the front and rear portions 4, 6.)

Although the seals whereby the four portions 4-10 are connected together are illustrated by single lines, it is to be understood that the cross-seals and the longitudinal and oblique seals that connect the front and rear portions 4, 6 to the side portions 8, 10 may vary in width and, for example, may extend out to the edges of the four portions 4-10.

As discussed before, the liner can be of any shape or size. If the liner comprises two panels, for example a pillow liner, then the first flexible panel will comprise at least one ply of thermoplastic material and the second flexible panel will comprise at least one ply of material that has a higher heat threshold than the at least one ply contained in the first flexible panel. The amount of portions that any particular liner has that comprise high heat threshold materials will at most be the amount of portions in the liner minus one. Likewise, there will always be at least one portion that comprises a high heat threshold material. For illustration purposes, if the liner has six portions, the number of portions that might possibly comprise high heat threshold materials would be anywhere from one to five. The amount chosen from the one to five range will depend on cost and the need for higher tensile strength and the desire to reduce tearing and stretching.

Although the invention has been described with reference to embodiments, persons skilled in the art will recognize that changes may be made in form and detail without departing from the spirit and scope of the invention. All directional references (e.g., rear, front, side, top, bottom) are only used for identification purposes to aid the reader's understanding of the embodiments of the present invention, and do not create limitations, particularly as to the position, orientation, or use of the invention unless specifically set forth in the claims. Joinder references (e.g., laminated, coextruded, attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected to another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, member or the like. It is intended that all matter contained in the above description or shown in the accompanying drawings shall be interpreted as illustrative only and not limiting. Changes in detail or structure may be made without departing from the spirit of the invention as defined in the appended claims.

We claim:

1. A liner for use in a bulk container, the liner comprising: a front portion, a rear portion, and first and second side portions, wherein:
   in a flat as-formed condition, the front portion and rear portion are opposed to one another and the first and second side portions are folded inwardly on themselves to form gussets and are interposed between the front portion and the rear portion; and
   the front, rear, and first and second side portions are sealed together and form six panels when in an expanded condition,
   wherein the front portion, comprises a ply of material that has a higher heat threshold than any ply of the remaining one or more portions.

2. The liner of claim 1, wherein the material that has a higher heat threshold is nylon coextruded with at least one material.

3. The liner of claim 1, wherein the material that has a higher heat threshold is nylon laminated to at least one other material.

4. The liner of claim 1, wherein the material that has a higher heat threshold is polyester coextruded with at least one material.

5. The liner of claim 1, wherein the material that has a higher heat threshold is polyester laminated to at least one other material.

6. The liner of claim 1, wherein three of the front portion, rear portion, and first and second side portions comprise a high heat threshold material and one of the front portion, rear portion, and first and second side portions comprise non-high heat threshold materials.

7. The liner of claim 1, further comprising a fitment arranged on the front portion.

8. The liner of claim 7, wherein the fitment includes a first fitment on the front portion and the liner further includes a second fitment on the front portion.

9. The liner of claim 8, wherein the first fitment is a fill fitment and the second fitment is a drain fitment.

* * * * *